United States Patent [19]

Bowers

[11] 3,920,024

[45] Nov. 18, 1975

[54] THRESHOLD TRACKING SYSTEM AND METHOD FOR STIMULATING A PHYSIOLOGICAL SYSTEM

[75] Inventor: David L. Bowers, Bellevue, Wash.

[73] Assignee: Vitatron Medical B.V., Dieren, Netherlands

[22] Filed: Apr. 16, 1973

[21] Appl. No.: 351,353

[52] U.S. Cl. .................. 128/419 PG; 128/419 P
[51] Int. Cl.² ........................................ A61N 1/36
[58] Field of Search ..... 128/419 PG, 421, 422, 423; 13/18, 28

[56] References Cited
UNITED STATES PATENTS

| | | | |
|---|---|---|---|
| 3,618,615 | 11/1971 | Greatbatch | 128/419 P |
| 3,661,157 | 5/1972 | Fyson et al. | 128/419 P |
| 3,669,120 | 6/1972 | Nielsen | 128/419 P |
| 3,757,792 | 9/1973 | Mulier et al. | 128/419 P |
| 3,769,986 | 11/1973 | Herrman | 128/419 P |
| 3,777,762 | 12/1973 | Nielsen | 128/419 P |

*Primary Examiner*—William E. Kamm
*Attorney, Agent, or Firm*—Benasutti and Preston

[57] ABSTRACT

A demand type pacing system for stimulating a physiological system such as a human heart, having an integrated control system for dynamically measuring the stimulation threshold of the heart for evoking a desired response and adjusting the stimulating level as a function of the measured threshold. The pacer has means for programmably varying the stimulation level so as to find the threshold, and backup circuitry to reestablish the stimulating level safely above threshold following a response failure due to either a programmed or naturally caused threshold detection.

35 Claims, 24 Drawing Figures

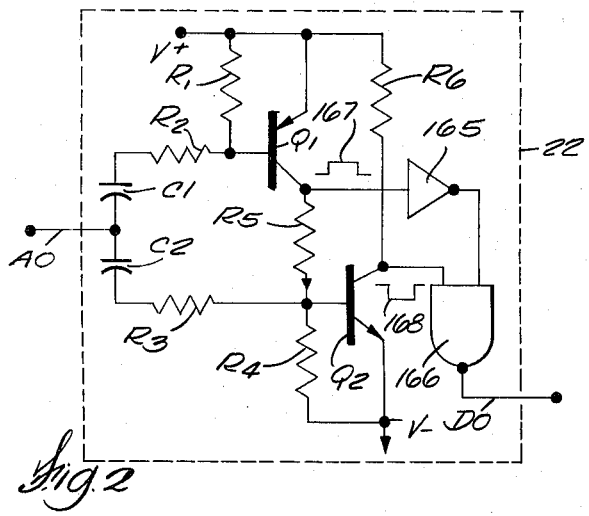
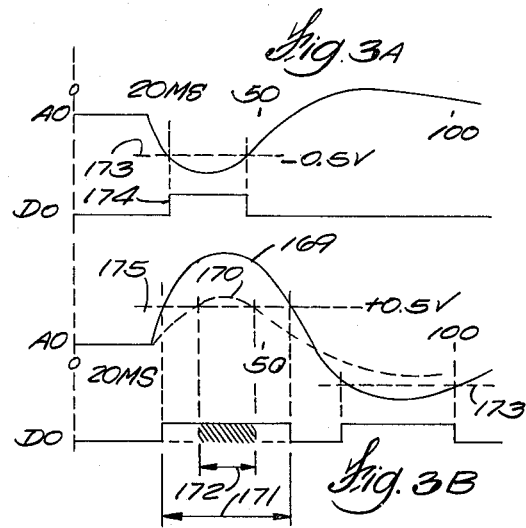
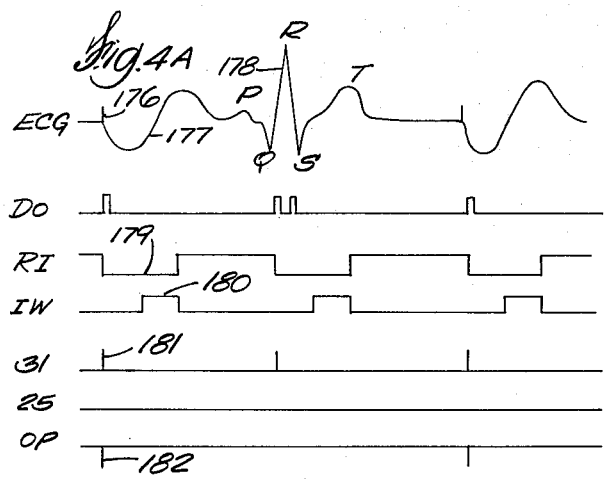
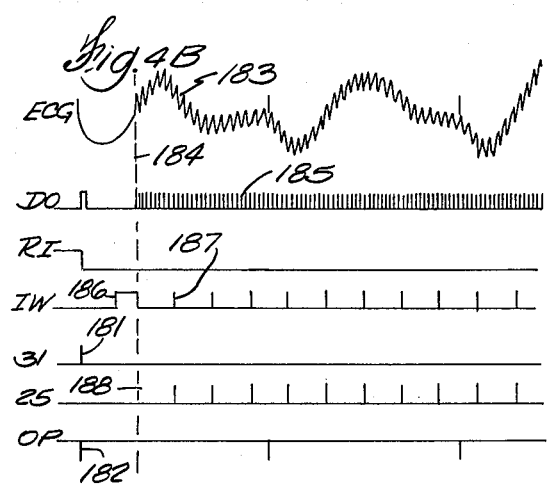
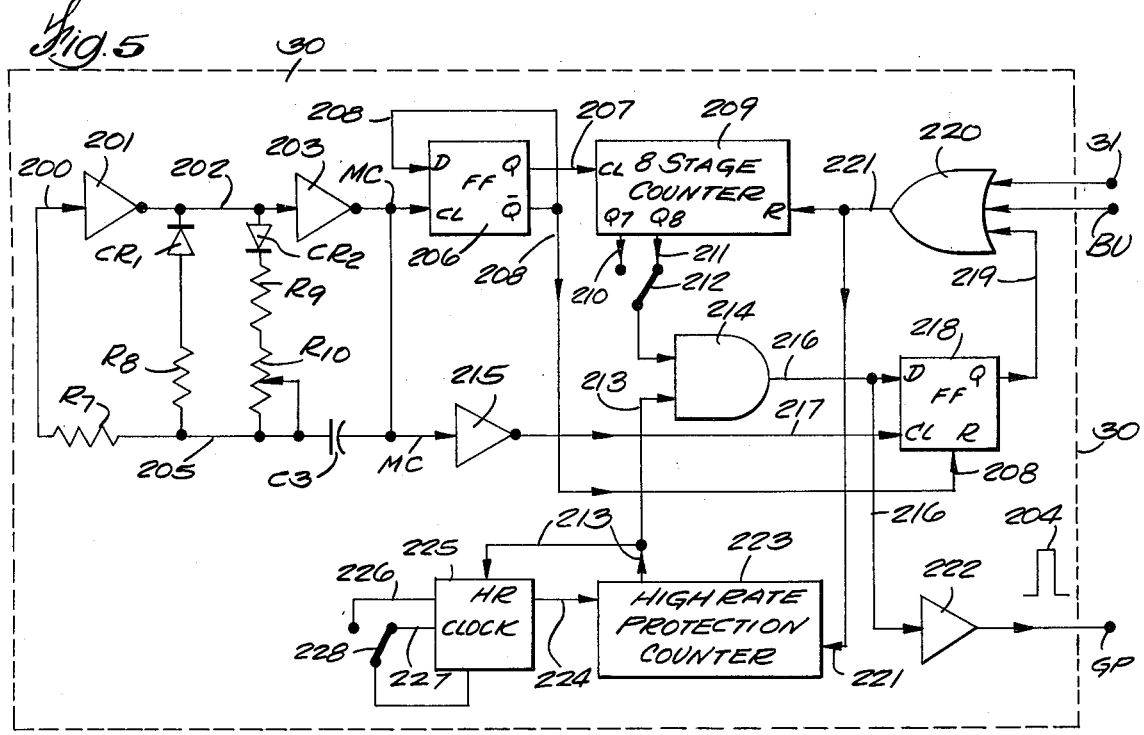

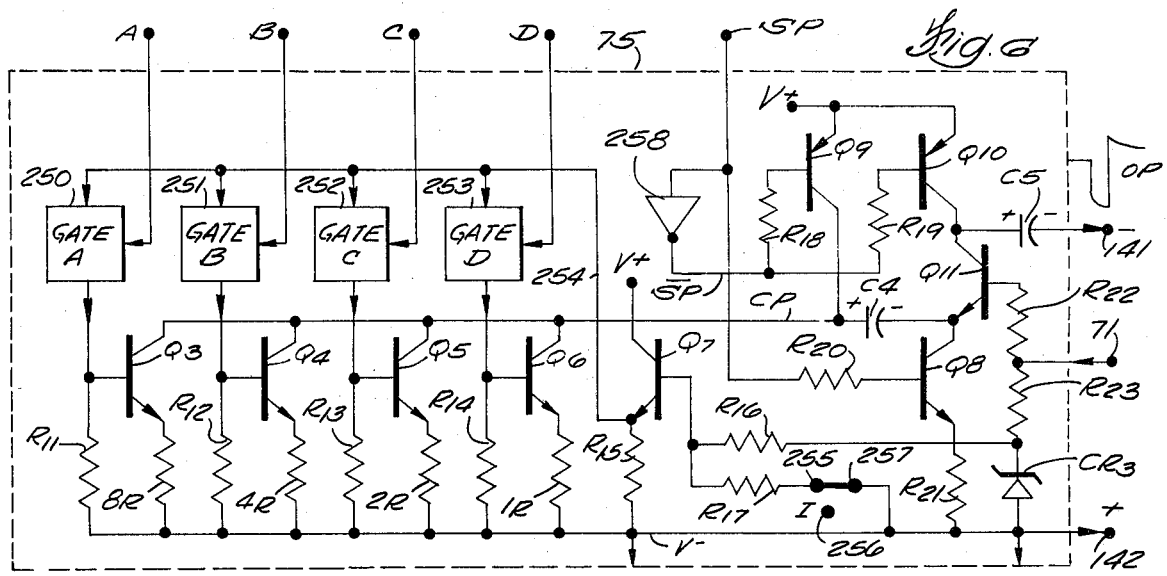
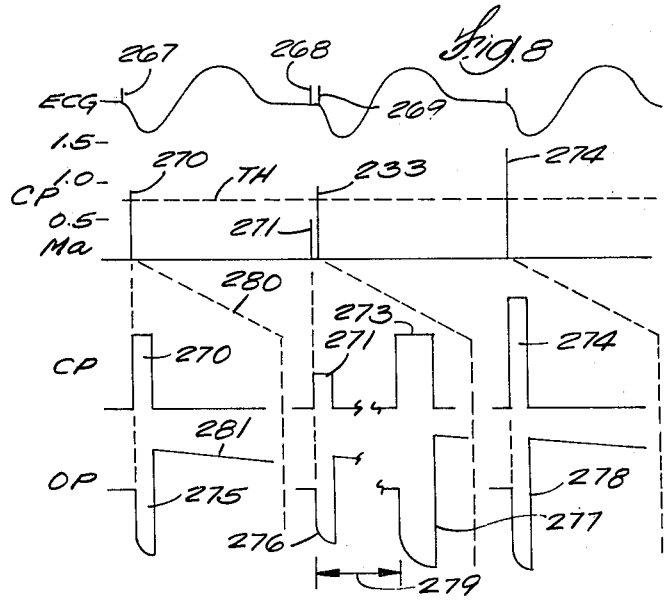
| D | C | B | A | ½ I MA | I |
|---|---|---|---|---|---|
| 0 | 0 | 0 | 0 | 0 | 0 |
| 0 | 0 | 0 | 1 | 0.5 | 1.0 |
| 0 | 0 | 1 | 0 | 1.0 | 2.0 |
| 0 | 0 | 1 | 1 | 1.5 | 3.0 |
| 0 | 1 | 0 | 0 | 2.0 | 4.0 |
| 0 | 1 | 0 | 1 | 2.5 | 5.0 |
| 0 | 1 | 1 | 0 | 3.0 | 6.0 |
| 0 | 1 | 1 | 1 | 3.5 | 7.0 |
| 1 | 0 | 0 | 0 | 4.0 | 8.0 |
| 1 | 0 | 0 | 1 | 4.5 | 9.0 |
| 1 | 0 | 1 | 0 | 5.0 | 10.0 |
| 1 | 0 | 1 | 1 | 5.5 | 11.0 |
| 1 | 1 | 0 | 0 | 6.0 | 12.0 |
| 1 | 1 | 0 | 1 | 6.5 | 13.0 |
| 1 | 1 | 1 | 0 | 7.0 | 14.0 |
| 1 | 1 | 1 | 1 | 7.5 | 15.0 |

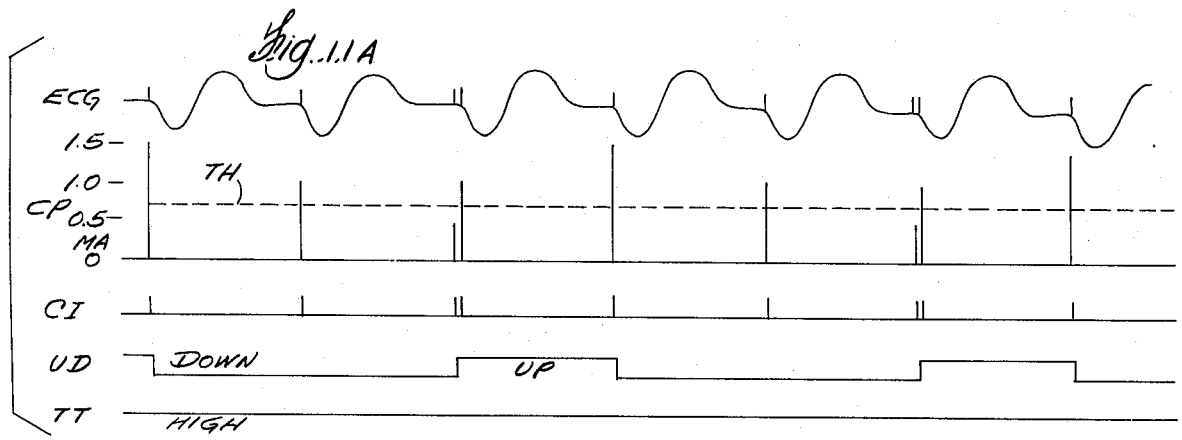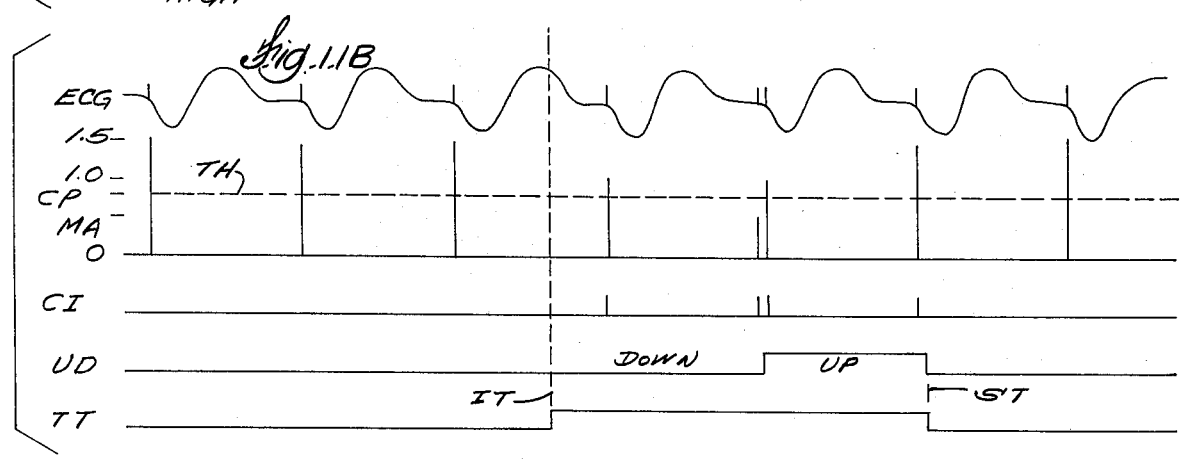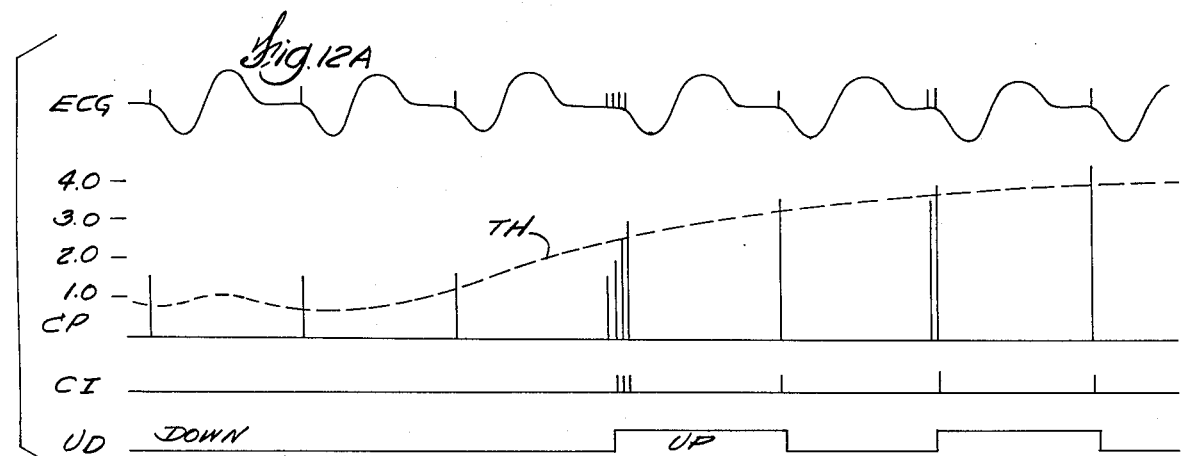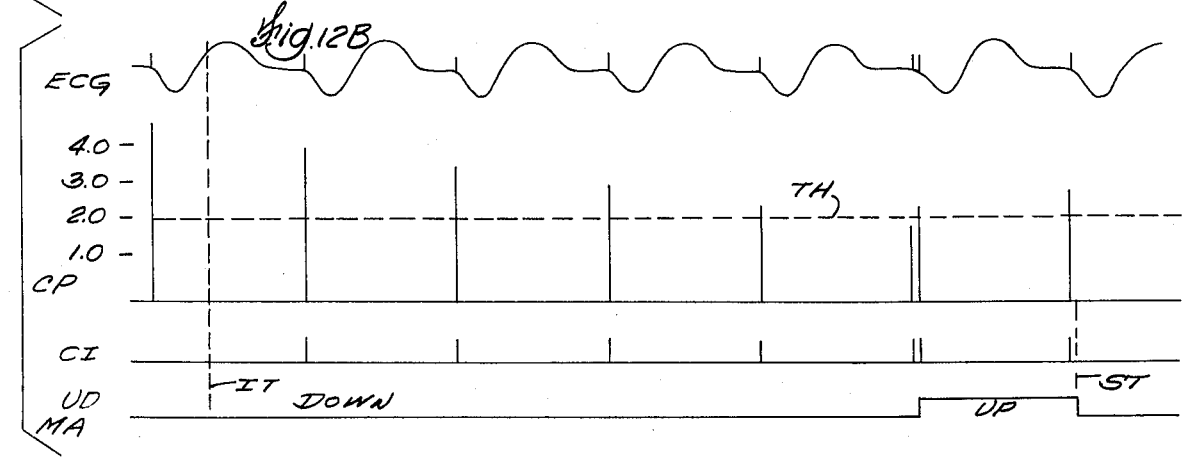

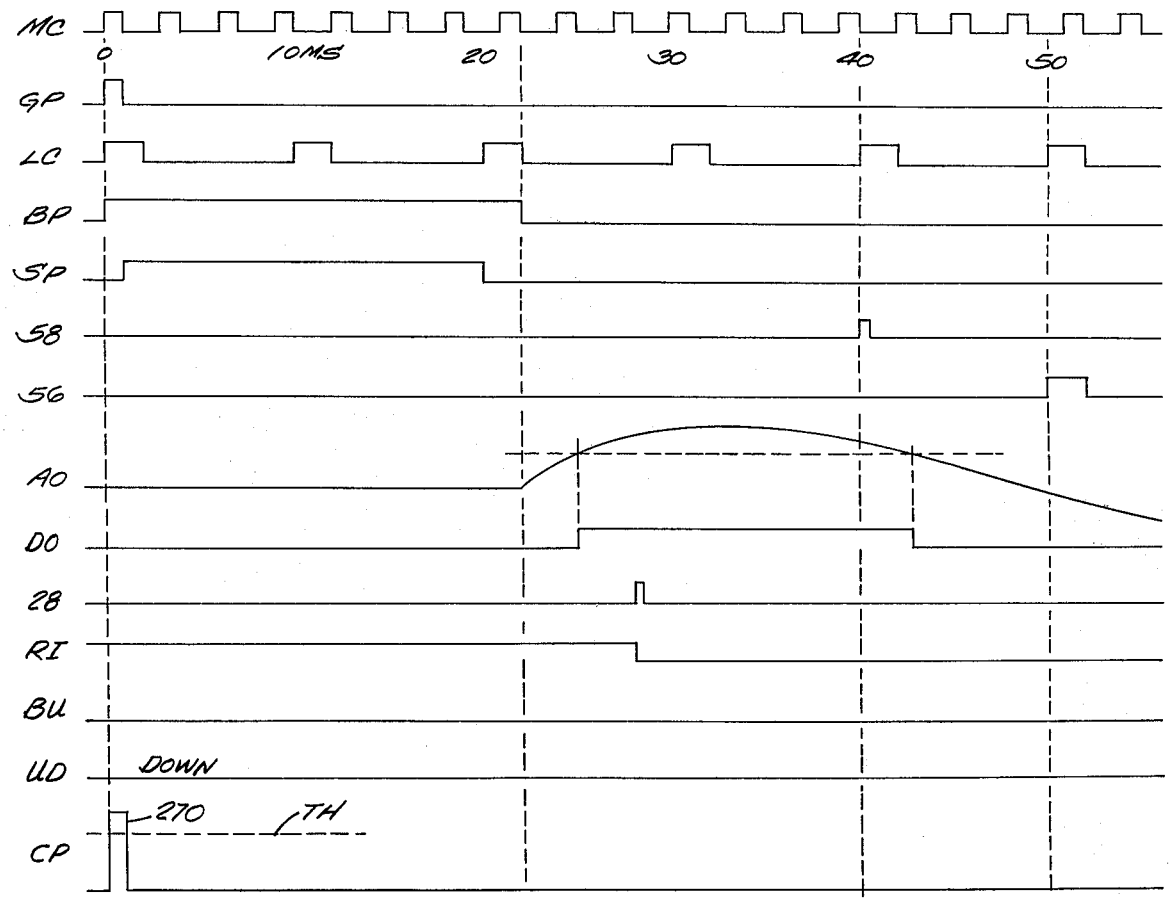
Fig. 10A — Above Stimulation Threshold
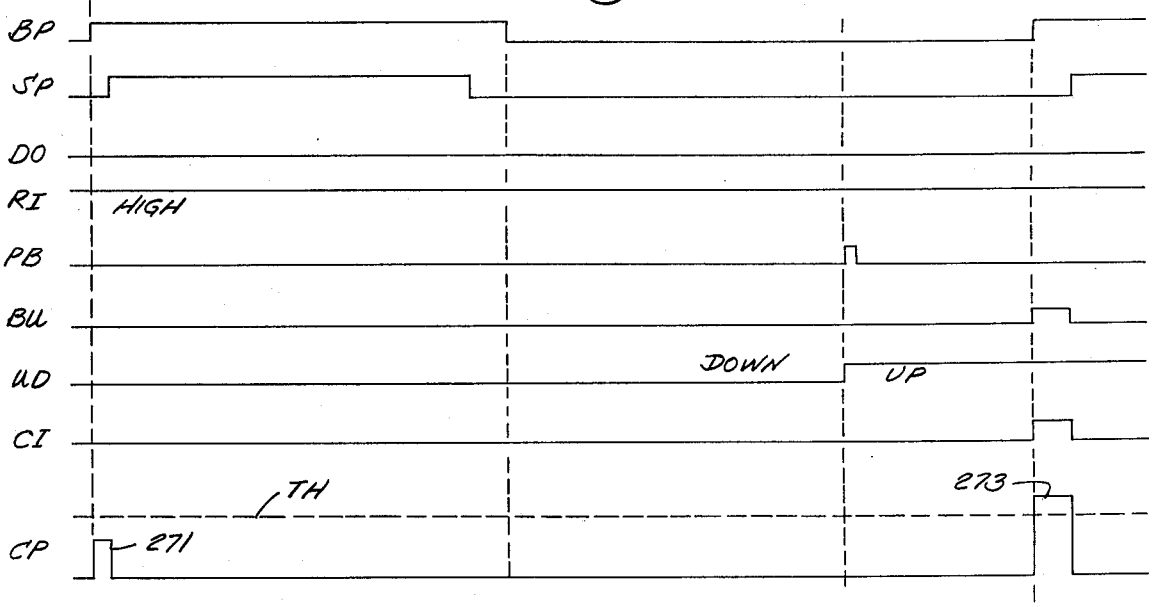
Fig. 10B — Below Stimulation Threshold

THRESHOLD TRACKING SYSTEM AND METHOD FOR STIMULATING A PHYSIOLOGICAL SYSTEM

BACKGROUND OF THE INVENTION

Various kinds of Pacemakers (Registered Trademark) are presently available and are operative to implement or supplement the normal functioning of a human physiological system. Generally such a Pacemaker or stimulator as presently known is an electronic device having electrodes which are either surgically implanted into or inserted in proximity to the heart of an individual requiring implemented stimulation. Included among the Pacemakers now available are those classified as a fixed rate type, a demand type, and an atrial-triggered type. As characterized by its name, a fixed rate or a synchranous Pacemaker is disposed to emit continuous pulses of a preselected rate and therefore continuously paces the heart system at a fixed rate with no change in rhythm or control influence from the physiological system. A demand or ventricular inhibited type Pacemaker is operative to emit pulses only when the physiological rate of the cardiac system falls below a preset value, thereby activating the Pacemaker to supply the necessary preset stimulus pulses. An atrial-triggered type Pacemaker is disposed to generate an impulse in synchronization with contractions of the atrium or auricle of a heart trying to simulate the normal cardiac conduction system between the atrium and ventricles, and by its complexity is considerably more restricted in its use.

At present there are a number of different methods used to test for stimulation threshold the most common including a test effected either during original implantation, or during subsequent generator replacement involving exposure of the heart leads with the resulting connection of those leads to an externally mounted test stimulator. In either case the test procedure to measure stimulation threshold has been identical and involves manual adjustment of the stimulus intensity to a level at which the heart fails to evoke a consistent depolarization response. As a result of manual tests, such as those briefly described, it has become accepted practice to define stimulation threshold as the minimum intensity necessary to produce a consistent cardiac response.

Some presently available Pacemaker systems provide manual means for effecting stimulation threshold testing and adjusting after implantation. Also included are remotely positioned means connected directly by a needle after implantation to effect adjustment or connected indirectly by magnetic means to effect adjustment. In all cases, however, both threshold testing and adjusting has been done manually and has not accurately reflect threshold level.

SUMMARY OF THE INVENTION

According to the present invention, a completely new and novel Pacemaker is provided with a novel stimulation threshold level tracking system that is adapted to effect graduated, repetitive tests at spaced intervals to ascertain the lowest threshold level adapted to evoke successively spaced heart stimulii or responses for insuring a continuance of heart beats. Means are provided to readjust the selected generated pulses in a manner to insure continued physiological stimulation of the heart at lowest possible threshold level without a prolonged cardiac response or substantially altering stimulus or rate and does not require external or implemented stimulations of the heart above the generated standard pulse then selected. To achieve this irrespective of the generated pulse rate then selected as adequate for system operation, an associated backup pulse of predetermined increased power relative to the generated pulse is made available for supplemental use. In the event of the physiological system actually failing to respond to a pulse within the existing selected generated pulse level, means are likewise provided to immediately connect the associated backup pulse to provide a supplemental stimulus of increased threshold level to insure a continuous and effective cardiac response.

Stated as concisely as possible, the physiological threshold level can be briefly described as the transition point or level at which an organ such as a human heart becomes responsive or non-responsive to an applied stimulus. Once such a determination is accurately made, as in the present invention, the next generated pulses are preset to occur at the lowest possible threshold level consistent with continued responsiveness of the physiological system to available stimulii within the selected level. Concomitantly therewith, backup pulses of graduated increased intensity level above the selected threshold level are then made available as explained to initiate an effective depolarization response within the physiological system.

To effect maximum flexibility in operation, the present threshold tracking system is operatively presettable to actually initiate repetitive test pattern systems in one of a plurality of different individual tracking procedures, as well as different combinations of those systems. For example, the threshold tracking system of the present invention can be preset to continuously track the threshold level. Likewise, the system can be programmed to track the threshold level at a predetermined time interval since the last test. Next, a test can be initiated to occur after applying a predetermined number of stimulus pulses to a body organ. In addition, of course these tracking systems can be combined in the most advantageous groupings particularly suited to existing operating conditions.

These specific independently inventive novel objects include the following:

An output stimulus applied to a body organ is programmed to track changes in threshold level through any selected range.

The threshold tracking sequence occurs on either a continuous recycling basis, a programmed sequence set by a predetermined time interval, or after a predetermined selected number of stimulus pulses have occurred.

A stimulus evoked response is sensed very quickly (within 20 to 30ms) after the stimulus is applied. If the evoked response does not occur within this interval, a second or backup stimulus is then initiated within 40 to 50ms since the last applied stimulus.

The second or backup stimulus is arranged to be applied with both increased output and increased pulse width to insure an effective evoked response.

Only a given number of second or backup stimuli are applied in any given interval following a regular stimulus in order to prevent an excessive number of stimulus pulses which may result in a stimulus being applied during an undesirable interval within the physiological response cycle.

A high rate or rate run-away protection circuit is incorporated in the system to protect the physiological system from a recurring rapid stimulus rate above a physiological rate limit, which may be caused by a failure in the pulse generator section.

Means are provided to rapidly stabilize the stimulator output circuit, as well as the electrode interface, thereby preparing the system to deliver a rapid backup stimulus in the event it is required.

A logic sequence for the system is controlled by a second logic clock and is arranged to be completely independent of the rate generator master clock. This second logic circuit is arranged to supply the logic signals for stimulus blanking, output stabilization, polarization compensation, and the second or backup stimulus pulse.

Another principal advantage of the invention is the sense and stimulus refractory circuit which provides the unique feature of rejecting interference signals during a selected portion of the refractory interval such as interference associated with power tools, autoignition etcetera and also reject power line frequency interference.

Upon the presence of interference, the stimulus system is disposed to revert to a fixed stimulus rate and have the stimulus output increased in intensity to compensate for any slight changes in threshold level which might occur during the interference period. Also in the event of continuous interference, all threshold testing is terminated, preventing any decrease in stimulus output which may cause intermittent stimulation.

BRIEF DESCRIPTIONS OF THE DRAWINGS

FIG. 2 illustrates the positive and negative signal level detector circuit;

FIGS. 3A and 3B illustrate positive and negative signal level detector waveform sequences;

FIG. 4A illustrates a wave form under normal cardiac stimulation and QRS detection;

FIG. 4B is a flow diagram showing signal wave forms during interference;

FIG. 5 is a circuit diagram of the pulse generator section;

FIG. 6 is the circuit diagram of the output circuit showing logic stimulus switches, output logic control, and a post stimulus stabilization circuit;

FIG. 7 illustrates a digital to analog conversion code;

FIG. 8 is a series of curves showing respectively stimulating pulses in relation to the ECG signal; the size of current pulses relative to threshold; the shape of the current pulses; and the shape of output pulses;

FIGS. 9A through 9F show six physiological diagrams;

FIG. 10A comprises a series of curves representing the timed relationship between various interconnected parts of the total circuit whenever the system is operating ABOVE STIMULATION THRESHOLD;

FIG. 10B comprises a series of curves representing the timed relationship between various interconnected parts of the circuit whenever the system is dynamically operating BELOW STIMULATION THRESHOLD;

FIGS. 11A and 11B are curves illustrating threshold testing when performed by the continuous mode and the momentary or programmed modes respectively; and FIGS. 12A and 12B are additional curves illustrating system performance relative to threshold.

DESCRIPTION OF THE PREFERRED EMBODIMENT

Figure 1A:
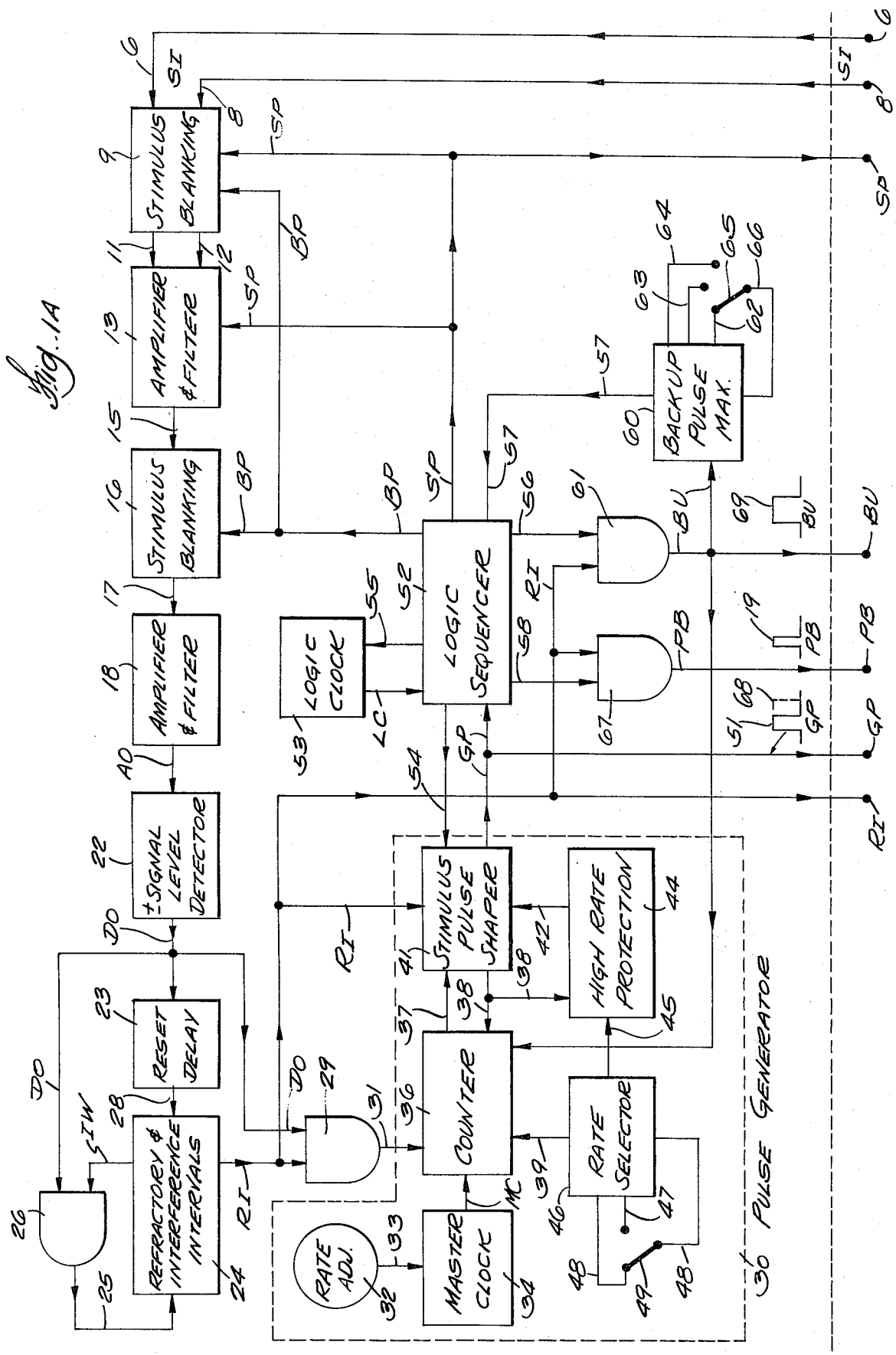
FIG. 1A is a block diagram showing means to sense and detect the presence of cardiac signals, and showing an adjustable rate generator and logic sequencer presetable to provide selected generator pulses and associated backup pulses operative to selectively implement those pulses.
Figure 1B:
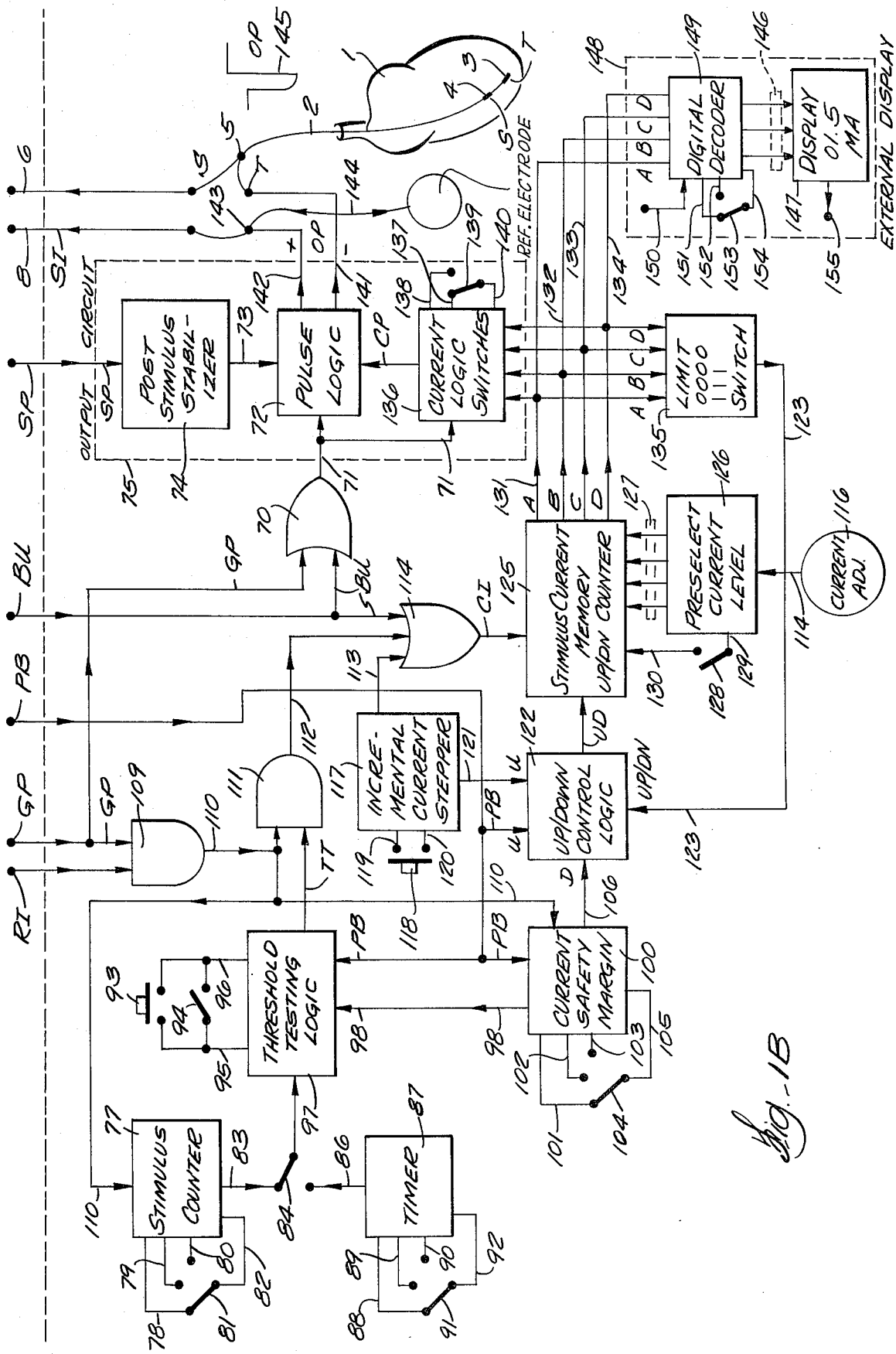
FIG. 1B is a block diagram showing the controlled portion of the invention responsive to the generator and backup pulses, and showing the manner of obtaining different repetitive testing patterns for cyclically testing the threshold level.

To show an introductory perspective of the interrelated plural novel features of this invention, there are provided the two block diagrams designated as FIGS. 1A and 1B. To facilitate reading each of these Figures, there are only seven conductors shown interconnected therebetween. Although each of these block diagrams is provided with a different plurality of novel features that are both completely independent, and yet coordinately interrelated depending upon the existing operating mode, each of them likewise is capable of individual principal advantages.

During normal continued stimulation of the heart, that is during operation above stimulation threshold, the curves shown in FIG. 10A graphically and dynamically illustrate the timed relationship and difference in spacing between the pulses. To facilitate reading the different pulses comprising each signal, an alphabetized letter code is provided that can be read against a descriptive glossary later defined.

Dashed line TH in FIG. 10A graphically illustrates adjusted current stimulation threshold. In other words, adjusted current pulse CP is graphically illustrated as operating above stimulation threshold, and neither a prebackup pulse designated as 58 nor a backup pulse designated as 56 are at that time either required or provided to then implement standard pulse CP, the intensity of which is determined by the existing automatic setting of rate pulse generator 30 and the resultant setting of UP/DN COUNTER 125. Where the current pulse CP is below TH, the pacer immediately provides the synchronously available backup pulse BU, of increased intensity as shown in FIG. 10B illustrating operation below stimulation threshold. Preliminary to connection of the first available backup pulse BU to actually energize pacing line 141 to energize electrode T in the heart 1 with a supplemental stimulus, an associated prebackup pulse PB, also shown in FIG. 10B, is likewise provided to condition the system.

Both associated supplemental pulses PB and BU are connected to provide increased supplemental stimulus pulses to the heart electrode T (3) in the heart 1 as soon as the existing standard current pulse CP is found inadequate to stimulate heart electrode T in the heart.- ..i.e., a lack of an evoked response which immediately initiates a backup (BU) pulse as described. In the event more than one backup pulse BU is required, a stepping switch control 60 is provided in FIG. 1A to effect a gradual increase in the total number of these pulses supplied until an evoked response appears.

In contrast with FIG. 10A, the pulse CP in FIG. 10B illustrates operation below the stimulation threshold. Thus, the standard current pulse CP is inadequate to provide sufficient current to the heart. As a consequence the next normally evoked signal or pulse from electrode S of the heart 1 fails to appear and backup pulse BU energizes pace conductor 141 after approximately 50 MS.

Therefore, operation of the entire system is effected either above or below the stimulation threshold with the changeover taking place automatically and only as required.

To place the objects and advantages of the invention in better perspective, it should be noted that the integrated block diagrams shown in FIGS. 1A and 1B as comprising the present threshold tracking system are connected to the physiological or cardiac system of the heart 1 shown in fragmentary form in FIG. 1B.

To effect this connection, a bipolar endocardial catheter or electrode 2, preferably tubular, extends within the heart 1 as shown in FIG. 1B, and is disposed to transmit stimulus current pulses between electrodes T and referencee plate electrode RE spaced at some distance from the heart. The endocardial electrode 2 with distal or terminal electrode T and also referred to as element 3 is positioned at the apex of the right ventricle within the heart. In a similar manner, the sensing electrode S is positioned within the heart 1 in a forwardly spaced position along the tubular conductive electrode 2 at a point indicated as 4 to clearly distinguish these positions.

Return circuits from the electrodes T and S within the heart 1 can be completed by the catheter 2 which is divided at its outward end into separately branching spaced apart conductors respectively designated as a stimulus pace line 141 and a sense line 6 which is connected to transmit information at its out end in FIG. 1A to a stimulus blanking block 9.

As stated, the forward outer end of the sense line 6 coming from the heart is connected to one input terminal of the stimulus blanking block 9, FIG. 1A, which has another spaced apart input terminal connected by a conductor 8, FIG. 1A and conductors 143 and 144, FIG. 1B to reference plate electrode RE.

In effect, therefore, a heart input sensing control circuit is completed from the heart 1 by the tubular or endocardial electrode 2 to stimulus blanking control 9, and thence, via the other conductors 8, 143 and 144 to the reference electrode RE at some distance from the heart.

Very briefly at this point, it is assumed the system is now dynamically operative at some safety factor above the stimulation threshold level, i.e. the existing inherent current stimulus level to this particular heart is more than adequate to evoke a heart response and thereby provide the necessary signal along sense line 6 to block 9. In addition to the evoked heart response signal following an applied stimulus, other signals are transmitted along sense line 6. Whenever the heart 1 is beating normally and at a faster rate than the stimulus rate of the pulse generator 30, the beating response from heart 1 will be transmitted along sense line 6 to blanking block 9. Also, unwanted extraneous signals are transmitted along line 6 such as the stimulus current artifacts, as well as interference signals that at times originate outside of the heart 1.

Stimulus blanking block 9 is provided to prevent the stimulus current artifact signals from passing through to enter either of the spaced ahead first and second amplifier filter stages 13 or 18. The stimulus blanking block 9 is provided to selectively reject these stimulus artifact signals from entering the amplifier filter stages.

From block 9, the signal is transmitted by conductors 11 and 12 to the first amplifier and filter 13. The signal then continues from the first amplifier 13 by a conductor 15 to a second stimulus blanking block 16, used to reject stimulus artifacts which may have been missed by the stimulus blanking block 9, and from there via conductor 17 to the second amplifier and filter stage 18.

After going through the second amplifier 18, the signal traverses an amplifier output conductor AO to enter a positive and negative signal level detector 22. Detector 22 performs two important functions relative to the entire system including the detecting of a signal as to polarity of signals emanating from the heart 1, and also providing an indication as to the pulse width of the signal then being transmitted there through. The signal is properly detected and identified upon its arrival in the detector 22 even though it might have been an inverted signal within the heart.

Thus, if a signal had been inverted in the heart 1, that signal can be detected equally as well in one polarity level as another polarity upon subsequently arriving in DETECTOR 22 in FIG. 1A.

The output from detector 22 is fed by conductor DO into a RESET DELAY 23 and from there into a REFRACTORY and INTERFERENCE BLOCK 24 by independent conductor 28. REFRACTORY BLOCK 24 has independent control or inhibiting power over other logic blocks or functions within the system. The conductor DO also is tied to an interference gate 26 to activate conductor 25 within an interference window interval IW. When interference signals are present on line DO, the conductor 25 is activated and continually resets block 24 preventing refractory interval RI from activating other logic elements.

From block 24, the conductor RI transmits a control signal to threshold test inhibit GATE 109 (FIG. 1B), and to a pulse generator INHIBIT GATE 29; to a stimulus pulse shaper 41 and to a BACKUP PULSE GATE 61 and a PREBACKUP PULSE GATE 67. In the event of interference, for example, the pulse width is caused to automatically increase from 1.0 ms, as graphically indicated at 51, to the wider dotted line width indicated at 68, and as shown rightwardly of conductor GP in FIG. 1A. This pulse width increase in the presence of interference is effected with a low RI signal entering BLOCK 41 in combination with an increased pulse width signal appearing on line 54 from Logic Sequencer 52 to SHAPER BLOCK 41.

If the output of refractory and interference interval block 24 remains high due to a missed evoked heart response when a particular BACKUP PULSE is processed through the GATE 61, the BACKUP PULSE then going through the LOGIC CONTROL SEQUENCER 52 in FIG. 1A will be processed through GATE 61 and thence will be processed through the entire system. In other words, the selective passing of a BACKUP PULSE, as described, is one of the principal advantages of this system. In effect, the selective BACKUP PULSE MAX block 60 provide means to limit the number of BACKUP PULSES delivered to the heart in any cycle. The reason for limiting the number of BACKUP PULSES is to prevent a consecutive run of increasing current stimulus pulses which may produce cardiac rhythmic responses or fall within an undesirable section of the cardiac cycle, especially true if the evoked heart signals are not properly sensed.

To preset the rate of the pulses available in the entire system there is provided a PULSE RATE GENERATOR 30 which can be preset to provide a standard pulse of selected pulse width that is processed to continue to supply pulses of that dimension through the entire system for particular cycles of operation. Such rate presetting can be done manually with RATE ADJUSTMENT control 32.

Lacking other changes in the system and assuming a normal continuance of heart beats via sense line 6 from the heart, GENERATOR 30 continues to supply positive signals via vertical line GP to GATE 70, so long as counter 36 is not reset by the occurrence of a cardiac signal originated naturally within the heart. The memory counter 125 is provided with a DIGITAL TO ANALOG conversion code operative in such a manner as to adjust a binary coded number by adjusting the selected four bit number to provide an equivalent analog current or intensity value. The analog code relationship of the four conductors A, B, C and D will be explained in somewhat greater detail in FIGS. 6 and 7.

Because of the novelty of coordinately selecting separately associated pulse stimulii of different value, it is again emphasized that two separate principle pulses have emerged from the upper portion of the circuit as shown in FIG. 1A. First there is a normal pulse of a 1.0 ms duration designated as 51, and shown coming down the conductor element GP. Next, there is a backup pulse designated as 69, having a 2.0 ms interval and coming down the conductor element BU. Upon both pulses GP and BU entering the system, both enter an OR circuit element 70 with the resulting output at conductor 71 now connected to energize pulse logic circuit 72. The proper intensity level of the then resulting output pulse is supplied from PULSE LOGIC block 72 via spaced apart conductors 141 and 142 to energize the heart 1. After delivery, of the described implemented stimulus pulses GP and BU, there is an output post stabilization period during which residual voltage appearing on the electrode would be stabilized. This occurs at the energizing or tip electrode T of element 3 within the heart 1, normally, this would be in about 19 ms. At the end of that time, the heart 1 would be ready to receive a BACKUP PULSE or another BACKUP PULSE within the system, if the system calls for such BACKUP PULSES. Before the next pulse a time interval elapses, such time interval in turn being determined by the RATE or PULSE GENERATOR SECTION 30, FIGS. 1A and 5.

Stimulation threshold is defined as the minimum current or intensity required to evoke a cardiac response. In other words, this is the minimum current required to produce a muscular depolarization within the heart. However, in the event a condition of being above stimulation threshold actually exists, there is no presently known way of determining the actual extent or degree of being above threshold.

It is repeated that when you are stimulating with adequate current under prior systems, pulse level cannot be determined. In other words, it is not possible to measure the level of safety factor above stimulation threshold. Therefore the system may be 5 percent, 10 percent, 25 percent or even 100 percent above requirements under existing prior systems with no presently known way to make such a determination. With the present repetitive testing system, however, a determination can be made as to the exact extent above stimulus threshold a stimulation can be effected that is adequate without being excessive. In other words, a stimulus is delivered without over-stressing or stimulating the cardiac system. Also the electrode and heart inter-face is not over-stressed, and any side effects from over driving this inter-face are reduced.

As will hereinafter be described, however, the lack of an evoked signal from the heart 1 operates to initiate a BACKUP pulse which is supplied from the OR GATE 70, junction 71 and output circuit 72 to provide a paced input signal to directly energize the pace line 141. The resultantly induced BACKUP pulse actually produces a step increase in the analog current now being supplied along pace line 141 until the current along this line is sufficient to actually evoke a heart response.

Preferably the system is preset is such a manner with backup pulse maximum block 60, FIG. 1A, that three of the described BACKUP pulses are ample in the analog control current along pace line 141 to energize or stimulate the heart. It should be readily apparent that the novel features of the present system can be incorporated with equal facility in other kinds of physiological systems as well as other sizes of physiological systems of the same kind. For example, the cardiac system of a 7 foot man would differ from that of a three foot child. Likewise, the cardiac system of one species might considerably from that of another species. Another important advantage of stimulating at the lowest level consistent with effective performance is a saving of total energy within the stimulator system and may extend the life of the operating stimulator.

Referring again to FIG. 1B, it should be noted a normal pulse corresponding to the setting of generator 30 is provided to memory counter 125. Actually the stimulus memory counter 125 consists of an UP/DOWN COUNTER. The described counter, although not essential, is preferred because of its simplicity of use. In other words, the direction of count can be altered selectively, that is counting up and down as required by input UD from on UP/DOWN CONTROL logic block 122. An UP count corresponds to an increase in stimulus current while a DOWN count produces a decrease in stimulus level. In the embodiment illustrated, the four output conductors 131, 132, 133 and 134 extending forward from the counter 125 and designated also as A, B, C and D and are selectively presettable in the binary code, as shown in FIGS. 1B and FIG. 6.

To accomplish this, stimulus current memory 125 must receive instructions for counting either up or down from an UP/DOWN CONTROL LOGIC 122. Assume at this moment that the existing operating condition is dynamic with no testing for threshold taking place, and assume also that the existing pulse level to the heart is operating according to an existing preset condition completely compatible with all present preset conditions.

As previously explained, this means the existing pulse level to the heart is sufficient to evoke successive heart responses. In other words, each stimulus is adequate but with there being no indication as to the actual measure of each safety factor above a corresponding level of safety.

With these conditions existing, the UP/DOWN LOGIC CONTROL 122, FIG. 1B is automatically preset in the down position in accordance with the existing preset dynamics of the system. This is done to insure that initiating a threshold test will always begin with a decrease in the available current or intensity to the heart 1, or until the heart misses one pulse, thereby eliceting a PREBACKUP PULSE PB, wave form 19, connected to switch the UP/DOWN CONTROL LOGIC 122 to the UP position producing a condition where the next counting input pulse CI will increase current. The described increased value due to movement to the UP position in response to pulse PB produces an increased current value for each succeeding BACKUP PULSE BU, but in reference to the last non-responsive GENERATOR PULSE GP. This increase in current with each BACKUP PULSE will continue until one of two conditions is reached. First, an evoked response occurs at the heart, sensed by line 6, and detected by DETECTOR 22, resetting refractory and interference interval 24, therefore inhibiting further BACKUP PULSES; or, second, the maximum number of BACKUP PULSES set by backup pulse maximum control 60 has been reached, resetting LOGIC SEQUENCER and terminating a BACKUP PULSE CYCLE. Missing of an evoking response by the heart 1, as the down logic control actuates the down counter 125 to supply gradually reduced current or intensity pulses to the heart, signifies that stimulation threshold has been passed in the downward direction. Further, the dynamics and novelty of the present system are such that failure to detect an evoked response following a current stimulus to the heart while the system is operating in the decreased current direction as described, effects a reversal in operation initiated by the PREBACKUP PULSE PB on the UP/DOWN LOGIC CONTROL 122, the latter changing immediately from providing a decrease in current stimulation to actually providing an increase in stimulus current for each BACKUP PULSE and the required increased current to provide a stimulus current safety factor set by CURRENT SAFETY MARGIN control 100, FIG. 1B.

Phrased in different manner, the described missed response by the heart indicates the stimulus current level then being received in inadequate to elicit continued cardiac responses. The resultant reverse of control 122 to its UP/LOGIC position provides an immediate change in the MEMORY 125 which then functions once again to provide a step increase in current stimulus level to the heart 1 for each GENERATED AND BACKUP PULSE gated through gate 114. At this time, however, the necessary number of BACKUP PULSES from the OR GATE 70 again provide increased current level to provide an evoked response. If required, a maximum of three back-up pulses are provided during this BACKUP cycle.

To more clearly understand the alphabetized code, the various letters comprising the code are arranged with a descriptive glossary explanatory of their use as follows:

| | |
|---|---|
| T | STIMULUS TIP ELECTRODE |
| S | SENSE ELECTRODE |
| SI | SENSE INPUT |
| BP | BLANKING PULSE |
| AO | AMPLIFIER OUTPUT |
| DO | DETECTOR OUTPUT |
| RI | REFRACTORY INTERVAL |
| IW | INTERFERENCE WINDOW |
| MC | MASTER CLOCK |
| GP | GENERATOR PULSE |
| LC | LOGIC CLOCK |
| SP | STABILIZATION PULSE |
| BU | BACKUP PULSE |
| PB | PREBACKUP PULSE |
| TT | THRESHOLD TESTING |
| UD | UP/DOWN CONTROL |
| CI | COUNTER INPUT |
| CP | CURRENT PULSE |
| OP | OUTPUT PULSE |
| RE | REFERENCE ELECTRODE |

To facilitate an understanding of the operation of various parts and coordinated functions that occur, the alphabetized code is provided in combination with the sequentially arranged reference numerals. Further, the alphabetized code introduces the various parts and functions interrelated in the system in the order of their presentation beginning with the physiological or cardiac system shown in fragmentary form at the upper end of FIG. 1B, and which shows the STIMULUS TIP ELECTRODE T and the SENSE ELECTRODE S within the heart 1. From the cardiac system, the principal conductors 6 and 8 extend upwardly out of FIG. 1B to join the same conductors in the upper, rightward end of FIG. 1A, and enter STIMULUS BLANKING block 9.

From BLOCK 9, FIG. 1A, the principal direction of flow continues in a downward, counterclockwise direction and thence via 11, 13, 15, 16, 17, 18, AO, 22, DO, 23, 28 and enters the refractory and interference interval block 24 which, as described has an inhibiting or timing control over other blocks in the system. As indicated by the directional conductors, the principal lines of flow continue in a generally counterclockwise direction in FIG. 1A, returning through the Pulse generator 30 and via the LOGIC SEQUENCER 52 and LOGIC CLOCK 53 to establish the subordinate control circuitry for presetting the PREBACKUP PULSE PB and the BACKUP PULSE BU. To further expedite an introductory summary of the two block diagrams 1A and 1B, the five parallel signals exit from FIG. 1A to interconnect with five like positioned signal conductors spaced along the upper edge of FIG. 1B. It will be apparent that the signal commands that enter FIG. 1B again continue in a counterclockwise direction as indicated by the directional conductors. The control gate 70 is so oriented as to complete the return BACKUP command pulse BU circuit to provide a complimentary BACKUP pulse directly to the heart 1 by conductors 141 and 142 if required.

The pulse generator 30, FIG. 5, establishes the repetition rate for the artificial stimulus pulse. The generator 30 can be reset or inhibited by the cardiac system, that is heart response signals appearing at the reset line 31. Two types of detected cardiac signals will reset the generator; 1) an evoked response following an artificial stimulus or 2) a cardiac signal originated within the heart's own physiological system. The pulse generator can be inhibited, that is preventing any generated pulses GP from appearing at the generator output, for extended periods of time when the detected cardiac signal being initiated by the physiological system is greater in repetition rate than the set rate of the pulse generator. This operating condition in terms of pulse rate inhibition can be compared with a ventricular inhibited pacemaker. For example, an idioventricular (heart) rate greater than the set generator rate of 75 PPM will inhibit the generator section. In other words, a detected signal interval, the interval between two succeeding heart signals, is shorter than the 800 ms (75 PPM interval period) interval established by the pulse generator 30. The novel features for the pulse generator 30 include the following:

1. The pulse generator section provides a unique digital counting system;

2. The pulse width of the generated pulse GP is the same pulse width as one master clock pulse. The feature here is that the master clock sets both rate and pulse width for the output generated pulse GP; and 3. High rate protection is designed into the pulse generator section for the purpose of preventing the generated pulse GP from exceeding a preset upper rate limit (140 PPM).

The POSITIVE and NEGATIVE SIGNAL LEVER DETECTOR 22 detects signals originating at the heart, having these signals amplified and filtered by the previous stages. If an amplified signal either positive or negative appears at the input terminal AO of the detector and its amplitude is sufficient to exceed the detector threshold level, a pulse will appear at the detector output DO. The width of the output detector pulse will be a function of the signal amplitude appearing at the detector input and this signal will be an amplified and filtered version of the signal originating at the heart. Therefore, the pulse width changes of the detector output signal DO will directly reflect amplitude changes of the sensed heart response signal, making it possible to monitor the signal strength of the evoked cardiac response.

DETECTOR block 22 shown in FIG. 1A is detailed in FIG. 2. Actually, the purpose of this signal level detector 22 is to convert an analog signal which has been processed by the previous amplifier and filter stages 18 and 13 into rectangular pulses. FIG. 3 shows the input (AO) and output (DO) wave forms for the signal level detector showing both negative (FIG. 3A) and positive (FIG. 3B) input signals.

The detector has a minimum level or detection threshold for both positive and negative input signals. Once this detection level is exceeded, a pulse will appear at the detector output. The width of the output pulse will be a function of the input signal level and monitoring of the output pulse width will indicate the signal strength of the detected or input signal. If the gain of the amplifier stages (18 and 13) is predetermined, and remains constant, the detector output (DO) pulse width changes will be a direct function of changes in signal level being sensed at the amplifier input (SI) and will reflect changes in signal level being detected from the heart.

Here is a detail description of detector operation relating to the circuit schematic shown in FIG. 2. The detector input signal AO appears on one side of capacitors C1 and C2. Depending on signal amplitude either in the positive or negative direction, one or the other of the capacitors will AC couple the signal to either transistors Q1 or Q2. For example, a negative signal (AO) like that in FIG. 3A will be coupled through capacitor C1 and resistor R2 rendering transistor Q1 conductive. Conduction of the transitor Q1 will only occur when the input signal is sufficient in amplitude to exceed the emitter to base forward junction voltage, usually 0.5 volt, for the transistor. When transistor Q1 is rendered conductive, a positive pulse 167 appears at the Q1 collector and across resistor R5. The pulse 167 is inverted at the output of inverter 165 before being ORed in logic element 166. The logic element 166 is a two input NAND gate, but when it is operated in negative logic, which means the input pulses are negative, the NAND gate in positive logic becomes a NOR gate in negative logic. Therefore, a negative pulse at the output of inverter 165 will be ORed and inverted through logic element 166 and appear as a positive pulse at the detector output (DO). FIG. 3A illustrates this positive pulse DO associated with the input negative signal AO. It is important to note the initiation and termination of the detector output (DO) pulse 174 as it is correlated with the input pulse AO when it exceeds the detector threshold level 173 or emitter to base junction voltage of Q1, usually 0.5 volt. When the input pulse AO exceeds this detector voltage level 173, a positive pulse 174 will appear and remain at the detector output DO. For long duration input signals the RC time constant of capacitor C1 and resistor R2 must be long enough to have the output pulse duration 174 correlated with the input signal AO.

The same general processing of the input signal occurs for a positive signal shown in FIG. 3B. A positive signal 169 appearing at the detector input will be coupled through capacitor C2 and resistor R3, rendering transistor Q2 conductive, producing a negative pulse 168 at the collector of Q2 and also across resistor R6. Again, the input signal, either positive or negative in amplitude, will only be detected at the output (DO) when the signal level exceeds a predetermined detection threshold level and in this detector system the detector level is established by the emitter to base forward junction voltage for Q2 or the base to emitter forward junction voltage of Q2, usually 0.5 volts. In this case, with a positive input signal AO the transistor network Q1 is not rendered conductive because of the reverse bias applied across the base and emitter junction. The converse is true when there is a negative input signal therefore making transistor Q2 nonresponsive.

A negative pulse 168 appearing at the collector of Q2 will be inverted through gate 166 and appear as a positive pulse, resembling pulse 171 in FIG. 3B. The gate 166 is a two input NAND logic element but with negative input pulses the logic element will operate as a NOR gate. The resistor elements R1 and R4 connect the bases of transistors Q1 and Q2 to the source terminals preventing transistor conduction due to circuit leakage current and also providing a path to reestablish charge on capacitor C1 and C2.

A novel feature of this SIGNAL LEVEL DETECTOR network 22 is the output pulse (DO) width being modulated as a function of the input signal (AO) level. FIG. 3B shows how input signal level determines the width of the detector output pulse. Input signal 169 is larger in amplitude than signal 170 and respectively the output pulse showing width 171 is larger in width than pulse 172. This pulse width modulation is accomplished by having the input signal exceed the detector level 175, and the amount of signal level over the threshold level 175 will give a degree of modulation to the output pulse DO. Changes in pulse width as a function of input signal is most sensitive when the signal is slightly above detector level 175. This means of pulse width modulation is most effective when the input signal approaches the detector level and such sensitivity can be well utilized in a cardiac Pacemaker system when it is important to know how well the system is detecting cardiac response. A weak cardiac signal--that is giving a small signal amplitude will produce a narrow detector output pulse DO signaling a possible problem in sensing if there would be further weakness in the cardiac response.

For example, in a practical system a detector output pulse (DO) with a pulse width of 20ms will indicate a strong or large input signal to the system and could be displayed to the physician or to the person who is testing the Pacemaker system that the sensed response is good and will detect all cardiac signals. A pulse width of 10ms at DO may be used to indicate that the sensed signal is fairly strong but may be marginal if the cardiac response changes due to adverse physiological conditions. The presence of a 5ms pulse width will definitely signify a potential sensing problem and corrective action should be immediately instituted to prevent the Pacemaker system from not sensing an effective cardiac response.

LOGIC SEQUENCER 52 shown in FIG. 1A is operative to provide the necessary logic sequencing to the system, being activated with each generator pulse GP. The sequencing time base is established by the independent logic clock 53. The following logic functions or pulses are provided by the logic sequences. FIGS. 10A and 10B are provided to show a plurality of flow diagrams illustrating the time and control relationship for each function, and respectively showing operation above and below stimulus threshold.

1. Stimulus Blanking Pulse is initiated with each stimulus pulse, either GP or BU, and the pulse BP is applied to the stimulus blanking blocks 9 and 16. The purpose for this blanking pulse is to blank out and prevent any stimulus pulse artifact present on line 6 from entering the amplifier and filter sections 13 and 18 and being detected by detector block 22. Also the BP pulse duration is sufficiently long to blank out the effects of electrode and polarization stabilization following each stimulus pulse to the heart.

2. Stabilization Pulse, SP--at the termination of each stimulus pulse there is a stabilization period required to stabilize the electrode interface, reestablish charge on the output circuit coupling capacitors block 74 (see charge on voltage stabilization on output pulse OP in FIG. 8, reference numeral 281.), and provide polarization voltage compensation at stimulus blanking block 9 and amplifier block 13. This polarization voltage compensation is important when this system is applied to electrode configuration given in FIG. 9B and 9C.

3. Pre-Backup Signal, 58--In every logic sequence there is a prebackup signal present on line 58. The pulse 58 will not pass through gate 67 unless there is a high RI signal present to coincide with a 58 pulse. Once a pulse 58 appears at the output of gate 67, it becomes a PB pulse transmitted to other control blocks within the system. The presence of a Pre-Backup Pulse, PB indicates that the last generated pulse GP applied to the heart was not sufficient in current or intensity to evoke a cardiac response.

4. Backup Signal, 56--Similar to the generation of pre-backup signal 58, the backup signal 56 will be present for every logic sequence initiated by the generated pulse GP. Gate 61 will only pass signal 56 and continue to pass this signal until an evoked heart response occurs or the limit of Backup Pulses, BU, have reached the number set by the Backup Pulse control 60.

5. Reset line, 57--The logic sequencer 52 will be continuously reset along line 57 with the occurrance of every Backup Pulse, BU, until the backup pulses disappear or the maximum number of backup pulses set by control 6 has been reached.

6. Output line 54--the first logic clock pulse to appear on the output line LC from the LOGIC CLOCK block 53 will be transmitted to stimulus pulse shaper 41. If signal interference is present and detected by the refractory and interference interval block 24, producing a low level RI signal, the low RI signal in combination with the pulse signal on line 54 will provide a wider pulse width for the generated pulse GP as shown by an increased GP pulse width 68.

The STIMULUS CURRENT MEMORY 125 sets the stimulus current or intensity level for all stimulus pulses delivered to the heart which includes both the generated pulse GP and the backup pulse BU. Assume that memory counter 125 is preset by the PRESELECT CURRENT LEVEL block 126 upon the activation of the enable switch 128. The preselected value is determined by the current adjustment control 116 transmitting this current value to block 126 by line 114. Operation of the enable switch 128 is required only upon the initial application of power to the circuit establishing preselected current value or digital code to the memory, and also during intervals when manual current setting is preferred over the automatic mode of threshold tracking. One application for manual current adjustment is during the initial insertion of the endocardial electrode 2 into the heart.

If the initial current setting is high enough in terms of stimulus current value, there will be an evoked cardiac response for every applied GP stimulus pulse. As far as the memory is concerned, everything is functioning well and there is no need to change logic code or current value. There are only two events which will alter the memory code (besides manual operation of the preselect current level block 126); 1) heart stimulation threshold increases and the GP pulse fails to evoke a heart response, therefore a backup pulse appears at the gate 70 and at gate 114. Two things occur at this point, the backup pulse BU passes through gate 114 and applies an input counting pulse to the memory, which is really an up/down counter set in the UP position by a previous prebackup pulse PB, adding one current or intensity step to the memory code.

At the same time, the BU pulse passing through gate 70 activates the pulse logic to apply the new stepped up current value to the heart for the duration or pulse width of the backup pulse. Therefore, the memory is used to set the current or intensity value for both the generated pulses GP as well as the backup pulses BU. As explained in the logic sequencer section, either the backup pulse BU will continue until an evoked cardiac response occurs; or, the maximum number of BU pulses will increase the memory 125 output digital code appearing on lines 131-134 by one count. A digital to analog, or stimulus current conversion table is given in FIG. 7. For example, if the generated pulse GP failing to evoke a cardiac response had a current level of 1.0ma operating in the 0.5ma per step setting (½I), the first backup pulse will be 1.5ma, the next 2.0ma, etc. until the above stated conditions occur. Once the backup pulse sequence is terminated, either by an evoked response or reaching maximum number of BU pulses, the memory or up/down counter 125 will continue to advance or receive counting input pulses CI but this time the pulses are GP pulses passing through gates 109, 111 and 114 and will continue to advance the memory by one count for every GP pulse until the safety margin limit set by block 100 has been reached, terminating this counting and increasing current cycle. It should be noted that the pre-backup pulse sets the UP/DOWN control 122 in the UP position, resets current safety margin block 100, and initiates the testing logic block 97 output TT in the high state, activating gate 111.

The second event which alters memory 125 occurs when a threshold test procedure is initiated. When this occurs the output line TT of block 97 becomes high and every generated pulse GP will pass through gate 111 and 114 producing a counting input pulse CI at the memory 125. The UP/DOWN control logic block 122 is now in the DOWN position, set in this position after the last current safety margin level was established on line 106, and the following GP pulses will reduce the applied current or intensity level to the heart by one step per GP until the GP stimulus current level is below stimulation threshold. The failure of an evoked response following a GP pulse will initiate a backup pulse in a short interval, approximately 40-50 ms following the GP pulse. As previously described the pre-backup pulse PB will set the UP/DOWN control logic 122 to the UP position and now every backup pulse BU will be increased in current or intensity by one current step. FIG. 11A and 11B illustrate this testing sequence, especially the counting relationship of the memory or UP/-DOWN counter and output stimulus current pulse CP level applied to the heart.

In summary, the memory counter 125 operates to set the stimulus current level for both the GP and BU pulses. The memory updating or changing sequence can be initiated either by the failure of an evoked response from the heart, or the procedure of threshold testing. In any event, the final memory setting or current level setting will include the current safety margin value established by the operational SAFETY MARGIN block 100.

It should be noted that the limit switch in block 135 is used to reverse the UP/DOWN control logic when the output code A, B, C, D reaches either extreme such as a 1111 count or 0000 count, thereby preventing low to high or high to low stimulating current extremes.

As previously stated, a principal object of this invention is to initiate stimulation threshold testing procedures at selectively spaced intervals during operation. The principal object is to ascertain as accurately as possible the existing stimulation threshold level. Activation of the THRESHOLD TESTING LOGIC BLOCK 97 to determines the threshold level by a plurality of different controls including switch, means 93, 94, 77 or 87 as will be explained.

If an artificial stimulus applied to the heart is sufficient to evoke a heart response, the only immediate information available is that the stimulus actually evoking the response is above stimulation threshold. In order to know how far above stimulation threshold this stimulus pulse is in terms of current or intensity, a threshold testing procedure must be initiated. This testing procedure can be initiated in a number of ways such as manually, continuous cycling, or in a program sequence.

The manual initiation occurs when switch 93 is pressed activating the threshold testing logic block 97 producing a high logic level output at TT connected to gate 111. High logic level at TT remains for the duration of the test. Under this condition with a high logic TT value, GP pulses will pass through gate 111 and 114, applying counting input pulses CI at the MEMORY or UP/DOWN counter 125. As already stated, the completion of a memory update cycle will always include the addition of the current safety margin value as set by SAFETY MARGIN block 100; and when the appropriate margin has been set, the testing logic block output TT goes low and the UP/DOWN control logic is set in the down position.

Following text initiation, these GP pulses appearing at CI, input to memory, will produce a down count or a decrease in the applied current stimulus to the heart. This cycle of decreasing GP pulses will continue until the associated heart response with the GP pulse fails, switching the UP/DOWN control logic 122 of the memory to the UP position, which is initiated by operation of the prebackup pulse PB. The following backup pulse or pulses BU will be increased per given step established by the current LOGIC SWITCH block 136 and associated control switch 139 (see digital code to stimulus current value in FIG. 7).

Again, the termination of the test occurs when the current safety margin value has been added to the generated pulse, GP. This may occur with one or a multiple number of GP pulses following the last BACKUP pulse. For example, a current safety margin value selected by switch 104 associated with block 100, can be one current step or one counting input pulse CI to the memory following the last backup pulse. In this case, the first GP pulse following the last BU pulse will add the one count or current step required to fulfill the safety margin requirement. A three step safety margin setting of switch 104, will require three step safety margin setting of switch 104, and will require three GP pulses to occur before the test can be terminated. The counting of GP pulses for determining the safety margin count as set in block 100 and by switch 104, is accomplished by using the GP pulses occurring on line 110 entering block 100 and being counted.

The continuous threshold testing mode, as illustrated in FIG. 11A waveform chart, shows that the logic signal TT always remains high, causing the testing procedure to be repeated on a continuous cycle sequence. Switch 94 placed in the closed position maintains the threshold testing logic BLOCK 97 in a continuous mode. The waveforms shown in FIG. 11A indicate a three GP pulse cycle sequence testing for threshold. In this case, the safety margin setting is one current step or memory count above the last backup pulse current or intensity setting. If the safety margin requirement is reduced to a zero step increase, the continuous testing mode will produce a backup pulse following every GP pulse because the stimulus current level will alternate between a GP pulse current level below stimulation threshold and a backup pulse BU above stimulation threshold.

As an additional safety feature, to make sure the BU pulse or pulses evoke a cardiac response, the BU pulse width is greater than the GP pulse width. Therefore a zero safety margin setting will test for stimulation threshold for every heart response. The opposite is true if the safety margin is increased to two steps, in which case the continuous testing mode will be on a five GP pulse cycle. Simply stated in an equation form, the number of GP PULSES in a test cycle equals two times the safety margin current step factor plus one. In other words, GP pulses = (2 × margin step) + 1.

The programmed testing sequence as shown in FIG. 11B occurs at various intervals. These intervals could be on a fixed time sequence as set by timer block 87, or after a certain number of stimulus signals have been applied to the heart block 77. One cycle is usually associated for each test initiation.

In some applications the threshold tracking system requires a visual read out of the applied stimulus current value. This is especially true in the clinical environment where the doctor wants a continuous display of the applied current to a patient and can use this current reading to monitor system performance such as electrode stability and long term threshold trends.

In FIG. 1B, the external display is blocked in at the lower right hand section designated as element 148, and within this section there is a decoder block 149 used to digitally decode the binary code appearing on lines A, B, C and D into a decimal output code carried on lines 146. Line 150 could be used to enable the decoder at various time intervals or cycle sequences within the threshold tracking system and therefore the display 147 connected to decimal lines 146 could give selected current readings for the generator pulse GP, backup pulse BU, above stimulation threshold, below threshold, stimulation safety margin, and average threshold reading. Switch configuration 153 and terminals 151 and 152 are used to select the given current range such as ½ I or I (ma). The display 147 gives the current value in a decimal reading format such as 1.5 ma. The output terminal 155 could be connected to a trend recorder used for long term histogram recording.

In summary, it is reiterated that the present invention comprises a plurality of independently novel operative features that are operatively interconnected to function coordinately as a completely integrated threshold tracking control system. To accurately ascertain the existing Stimulation Threshold Level, novel means are provided to initiate test procedures at selectively, spaced intervals controlled by switch means 77, 87, 93 or 94 as described. It is also emphasized that both the PRE-BACKUP and BACKUP pulses comprise independently novel control means particularly adapted to provide means for achieving supplementary control of variable intensity. Although the term BACKUP is particularly apropos of the additional and variable power obtained, it is likewise emphasized that the broad principles involved can be used in other applications providing either testing for or supplying a variable and selective transmission of additional intensity level at spaced intervals. In other words the term BACKUP is in no way considered restrictive and other generic terms such as modifying, supplementary, and pulse means are equally appropriate.

From the foregoing detailed description of the illustrative embodiment set forth herein to exemplify the present invention, it will be apparent that there has been provided a completely novel and improved threshold tracking control system.

Although the illustrative embodiments of the invention have been described in considerable detail for the purpose of disclosing a practical operative structure and circuitry control means whereby the invention may be practiced advantageously, it is to be understood that the particular interconnected apparatus, circuitry and physiological means described are intended to be illustrative only, and that the various novel characteristics of the invention may be incorporated in other structural forms without departing from the spirit and scope of the invention as defined in the subjoined claims.

What I claim is:

1. A method of sensing and stimulating physiological activity of a body organ included as a portion of a physiological system, comprising:
    a. sensing to determine the occurrence of said physiological activity;
    b. generating stimulation pulses at a predetermined repetition rate and connecting one of said pulses to said body organ when absence of said physiological activity is sensed for a first predetermined interval defined by said repetition rate;
    c. generating, following each such generated stimulation pulse, a predetermined series of backup pulses; and
    d. connecting the pulses of said series serially to said body organ following failure of said physiological activity within a second predetermined time interval following connection of one of said stimulation pulses, until an occurrence of said physiological activity is sensed, and thereafter inhibiting connection of the remaining pulses of said series to said body organ.

2. The method as described in claim 1, wherein said second time interval is less than said first time interval.

3. The method as described in claim 1, wherein said series of backup pulses is generated within the time interval between successive stimulation pulses.

4. The method as described in claim 3, wherein the first of said series of backup pulses is generated within about 40-50 ms following said each such stimulation pulse, and each succeeding backup pulse is generated and connected to the body organ within about 40–50 ms following the prior backup pulse.

5. The method as described in claim 1, wherein the first backup pulse has an intensity level greater than the immediately preceding stimulating pulse, and each successive backup pulse has an intensity level greater than the previous backup pulse.

6. The method as described in claim 5, wherein the energy level of successive backup pulses increases in predetermined increments.

7. The method as described in claim 5, wherein the pulse width of successive backup pulses is increased relative to respective preceding backup pulses.

8. The method as described in claim 5, wherein said series comprises three backup pulses.

9. The method as described in claim 5, further comprising resetting the energy level of the next succeeding stimulation pulse after the step of connecting a backup pulse to said organ.

10. The method as described in claim 9, comprising determining the stimulus level at which a backup pulse first evokes responsive physiological activity following sensing failure of occurrence of said physiological activity and setting the energy level of the next succeeding stimulation pulse at a predetermined safe energy level above said evoking level.

11. The method as described in claim 5, wherein the number of said backup pulses connected is limited to a predetermined number.

12. The method as described in claim 1, comprising changing the energy level of said stimulation pulses in a predetermined way until said failure is sensed.

13. A demand type pacing system for stimulating cardiac response of a patient, said system having means for delivering signals to and receiving signals from said patient's heart, comprising:
    a. means for sensing to determine the occurrence of heartbeats of said patient;
    b. means for generating periodic stimulation pulses for stimulating heartbeats in said patient;
    c. first connecting means for connecting one of said stimulation pulses to said heart whenever absence of a heartbeat is sensed for a first predetermined time interval;
    d. backup means for generating, following each such generated stimulation pulse, a predetermined series of backup pulses, said backup pulses having a predetermined time and energy relationship to the preceding stimulation pulse;
    e. second connecting means, for connecting the pulses of said series serially to said patient's heart following the failure of a sensed heartbeat within a second predetermined time interval following connection of one of said stimulation pulses.

14. The system as described in claim 13, wherein each successive backup pulse has a greater energy level, and comprising means for readjusting the energy level of following stimulation pulses as a function of the energy level of the backup pulse which evokes a heartbeat.

15. The system as described in claim 14, comprising means for changing the energy level of said stimulation pulses in a predetermined way until said failure to sense said heartbeat occurs.

16. In a system for sensing and stimulating responses in a physiological system of a human patient, apparatus comprising the combination of stimulus generating means for generating periodic stimulus signals and threshold testing means for determining the stimulus threshold for evoking a response with a generated stimulus signal, said threshold testing means comprising
   a. program means for programming changes in the level of said stimulus signals and for detecting threshold by determining the stimulus level which first fails to evoke a response,
   b. backup means for generating at least one backup stimulus signal of a level greater than said first level and following such first stimulus within an interval such that no response is missed,
   c. memory means for remembering the level of the last generated stimulus signal, and
   d. logic means operating in combination with said memory means to set the next succeeding periodic stimulus signal following threshold detection at a level providing a predetermined safety margin.

17. The system as described in claim 16, comprising logic means for combining said backup means operatively with said program means in a manner such that upon any said failure to evoke a response with a stimulus signal the next succeeding heartbeat normally due in said patient is evoked by a backup stimulus signal, whereby there is no missed heartbeat.

18. The system as described in claim 16, in combination with sensing means adapted for sensing cardiac responses and stimulus delivery means for delivering said stimulus signals to the heart of a human patient, and wherein said sensing means is adapted to detect the presence or absence of an evoked response to a delivered stimulus signal within a time period of 20–50 ms following the delivery of said stimulus.

19. The system as described in claim 16, wherein said threshold testing means comprises logic means for carrying out threshold testing in a programmed cycle mode.

20. The system as described in claim 16, wherein said threshold testing means comprises logic means for carrying out said threshold testing in a continuous mode.

21. The system as described in claim 16, wherein said memory means comprises an up/down counter.

22. The system as described in claim 16, comprising manual testing means for testing for threshold.

23. The system as described in claim 16, comprising means for sensing signal interference and means for inhibiting said programmed changes during said sensed signal interference.

24. The system as described in claim 23, comprising means for increasing the intensity level of said stimulus signals upon sensing of said signal interference.

25. Demand pacing apparatus for stimulating cardiac responses in a patient, comprising:
   a. sensing means for periodically sensing to determine the occurrence of heartbeats;
   b. generator means for generating pacing signals at a predetermined repetition rate;
   c. connecting means operatively responsive to said sensing means for connecting said pacing signals to said patient's heart when the patient's heartbeat is not sensed for a predetermined interval defined by said repetition rate;
   d. second generating means for generating a predetermined series of backup pulses following each said generating pacing signal; and
   e. logic means, operatively responsive to said sensing means, for connecting the pulses of said series of backup pulses serially to the heart when no heartbeat is sensed following a connected pacing signal, until a heartbeat is evoked.

26. The apparatus as described in claim 25, wherein said second generating means is further characterized by generating said series of backup pulses such that each backup pulse has a predetermined time relation to the prior pacing signal.

27. The apparatus as described in claim 25, comprising programming means for causing programmed changes in the energy level of said pacing signals, whereby threshold testing is carried out.

28. In a demand pacing apparatus which generates periodic pacing stimulus signals for cardiac pacing of a patient, which apparatus is adapted to transmit said pacing signals for delivery to the patient's heart and to receive patient signals representative of cardiac response, a threshold tracking system for determining the patient's cardiac threshold to said pacing stimulus signals, said threshold tracking system comprising;
   a. digital increment means for controlling the intensity of said pacing stimulus signals to predetermined incremental levels;
   b. program means in combination with said digital increment means for setting the intensity of said pacing stimulus signals;
   c. means for detecting threshold by determining when a stimulus signal of a given level fails to evoke a cardiac response;
   d. said threshold detecting means including means for generating a series of signals during the time interval between said detected failure and the next periodic pacing signal; and
   e. logic means for programming said digital increment means in response to detected threshold, whereby said pacing signals are programmed to be of an intensity above said threshold following such failure.

29. The system as described in claim 28, wherein said digital imcrement means comprises up/down counter logic circuitry.

30. The system as described in claim 28, wherein said program means comprises threshold searching means for searching for the patient's threshold.

31. The system as described in claim 28, wherein said threshold detecting means comprises prebackup control means to control the operation of said series generating means.

32. The system as described in claim 28, wherein said logic means controls the intensity of said pacing signals to a level above the detected threshold level which corresponds to a predetermined margin of safety.

33. A demand pacer for cardiac pacing, adapted to operate with a connecting system for delivering signals to and receiving signals from a patient, comprising:
 a. stimulating means for generating heart stimulating pulses;
 b. detecting means for detecting natural heartbeats and inhibiting means for inhibiting said stimulating means on the occurrence of natural heartbeats;
 c. interference sensing means for sensing interference signals;
 d. means for testing for the threshold to said heart stimulating pulses of the patient being paced by the pacer;
 e. means for inhibiting said threshold testing during the presence of said sensed interference signals; and
 f. means for increasing the intensity of said heart stimulating pulses upon sensing interference signals.

34. A demand type pacing system for stimulating cardiac response of a patient, said system having means for delivering signals to and receiving signals from said patient's heart, comprising:
 a. means for sensing to determine the occurrence of heartbeats of said patient;
 b. means for generating periodic stimulation pulses for stimulating heartbeats in said patient;
 c. first connecting means for connecting one of said stimulation pulses to said heart whenever absence of a heartbeat is sensed for a first predetermined time interval;
 d. backup means for generating, following each such generated stimulation pulse, a predetermined series of backup pulses;
 e. second connecting means, for connecting the pulses of said series serially to said patient's heart following the failure of a sensed heartbeat within a second predetermined time interval following connection of one of said stimulation pulses;
 f. logic means connected to said backup means for controlling the value of each pulse of said series, and having an input for receiving logic signals, said controlling being a function of said received logic signals; and
 g. failure logic signal means connected to said sensing means for generating a failure logic signal when said failure is sensed, said failure logic signals being connected to said input circuit, whereby said series pulses are logically controlled by said logic means following each said failure.

35. The system as described in claim 34, wherein said logic means controls said backup pulses such that each successive backup pulse has a greater energy level, and further comprising readjustment means connected to said logic means for readjusting the energy level of the next successive stimulation pulse following failure.

* * * * *

PO-1050
(5/69)

UNITED STATES PATENT OFFICE
CERTIFICATE OF CORRECTION

Patent No. 3,920,024    Dated November 18, 1975

Inventor(s) David L. Bowers

It is certified that error appears in the above-identified patent and that said Letters Patent are hereby corrected as shown below:

Column 1, line 17, delete "synchranous" and insert --synchronous--.
Column 5, line 15, delete "referencee" and insert --reference--.
Column 6, line 22, between "INTERFERENCE" and "BLOCK", insert
             --INTERVAL--.
Column 6, line 23, delete "REFRACTORY".
Column 9, line 13, after "SEQUENCER" insert --52--.

Signed and Sealed this sixteenth Day of March 1976

[SEAL]

Attest:

RUTH C. MASON
Attesting Officer

C. MARSHALL DANN
Commissioner of Patents and Trademarks